April 10, 1962 R. C. FERRAR 3,029,336
SIGNAL LEVEL RECORDING RECEIVER
Filed June 4, 1958
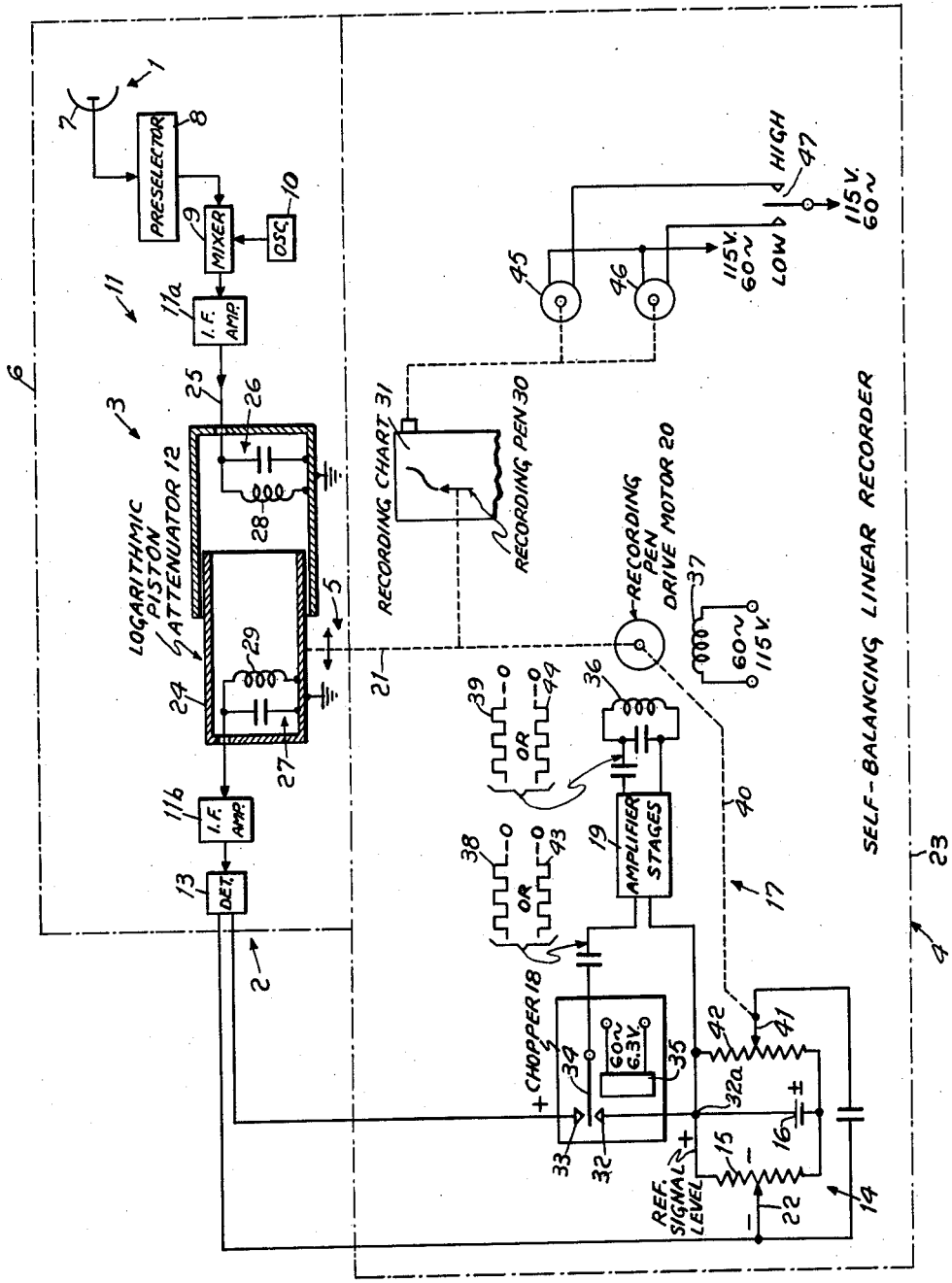
Inventor
ROBERT C. FERRAR
By Alfred C. Hill
Agent United States Patent Office 3,029,336
Patented Apr. 10, 1962

3,029,336
SIGNAL LEVEL RECORDING RECEIVER
Robert C. Ferrar, Highlands, N.J., assignor to International Telephone and Telegraph Corporation, Nutley, N.J., a corporation of Maryland
Filed June 4, 1958, Ser. No. 739,702
11 Claims. (Cl. 250—2)

This invention relates to signal level recording devices and more particularly to an improved cooperative combination of signal receiver and signal level recorder whose overall response is logarithmic with respect to signal amplitude changes.

Prior to installing a radio link, particularly of the scatter type, it is good procedure to obtain information as to the radio propagation loss and the distribution of radio propagation loss with time over the proposed propagation path between transmitting and receiving antennas. This necessitates taking continuous path loss measurements over the proposed propagation path preferably during the time of the year when the time distribution of the hourly median path loss values are at their worst. In tropospheric propagation far beyond the horizon, it has been determined that the monthly median path loss is greatest during the coldest months of the year. Thus, to obtain sufficient information about propagation loss, it is desirable to make continuous path loss measurements for about one month during this time of the year. The information on propagation loss over the proposed propagation path is a valuable tool in determining the transmitter power, the receiver bandwidth and the combined antenna gain of the final equipment employed for communication over the propagation path.

To obtain the above type of information, and for many other purposes where continuous recording of the signal level is contemplated, it is desirable to have a signal receiver and a continuous chart-type recorder combination whose overall response is logarithmic with respect to signal amplitude changes. One arrangement for obtaining this desired receiver-recorder is to employ a receiver employing automatic gain control and a logarithmic recording device. This arrangement while it will perform as desired under certain situations has certain disadvantages that make it undesirable under other situations. These disadvantages are that automatic gain control receivers are difficult to calibrate and that the combination of such receivers with logarithmic recorders to achieve a desired overall logarithmic resonse is awkward because of the large dynamic range over which the receiver must produce constant gain to yield the desired accuracy for the overall system.

An object of this invention is to provide a signal path and recorder combination having an overall logarithmic response with respect to signal level changes which is an improvement over the prior art arrangement.

Another object of this invention is to provide a signal receiver and recorder combination having an overall logarithmic response with respect to input signal level changes overcoming the disadvantages of the prior art receiver-recorder arrangement.

Still another object of this invention is to provide a signal receiver which does not incorporate automatic gain control having a logarithmic signal attenuator disposed in the receiver signal path and a linear recorder disposed at the output of the signal receiver, the logarithmic attenuator and linear recorder being interconnected to provide an overall response which is logarithmic with respect to input signal level changes.

A feature of this invention is the provision of an attenuator disposed in a signal path and means coupled to the output of the signal path and to the attenuator which is responsive to amplitude changes of the signals in the signal path to actuate the attenuator to return the signals at the output of the path to a predetermined value and to simultaneously record the amplitude changes.

Another feature of this invention is the provision of a signal receiver having signal input means and signal output means, and an attenuator coupled intermediate the input means and the output means. At the output means of the receiver there is coupled an arrangement to provide a given reference signal level. To this same output means, there is coupled a means responsive to the difference between the signal level at the output means of the receiver and the reference signal level to actuate said attenuator to return the signal level at the output means of the receiver to the reference signal level and to simultaneously record the signal level changes at the output means of the receiver.

Still another feature of this invention is the provision of a waveguide beyond cutoff having a stationary energy coupling loop at one end and a movable energy coupling loop mounted on a piston as the logarithmic attenuator of the arrangement of this invention.

A further feature of this invention is the provision of a mechanical linkage between the pen-drive servo motor of a continuous self-balancing chart recorder and the piston of the above-described attenuator such that a change in signal level as detected at the output of the receiver actuates the pen-drive servo motor for recording the change of signal level and simultaneously drives the piston of the attenuator until the signal level at the output of the receiver returns to its initial value.

The above-mentioned and other features and objects of this invention and the manner of obtaining them will become more apparent by reference to the following description taken in conjunction with the drawing, the single FIGURE of which illustrates schematically an embodiment of my invention.

In accordance with the figure of the drawing the invention herein disclosed includes a signal path between the input means 1 and an output means 2 having disposed intermediate thereof an attenuator 3. A means 4 is coupled to the output means 2 of the signal path and to attenuator 3 by means 5. Means 4 is responsive to amplitude changes of the signals in the signal path such that the output of means 4, means 5, actuates attenuator 3 in a manner to return the signals at the output of the signal path to a predetermined value. Means 4 includes an arrangement to simultaneously record the amplitude changes at the output of the signal path as attenuator 3 is actuated to return the signals at the output of the signal path to the predetermined value.

More particularly, the figure of the drawing illustrates a signal receiver 6 including an antenna 7 to receive signal waves propagated from a remote transmitter. The signals accepted by antenna 7 are passed to a preselector 8 which may be a highly selective radio frequency amplifier to properly select the desired transmitted signals. The output of preselector 8 is coupled to a mixer 9, which in conjunction with the output of an oscillator 10, heterodynes the received signals for application to an intermediate frequency amplifier 11. In the arrangement illustrated in the figure of this application, intermediate frequency amplifier 11 is divided into two sections; a first section labeled 11a and second section labeled 11b. Intermediate these two intermediate frequency amplifier sections is disposed attenuator 3 which is depicted herein as a logarithmic piston attenuator 12, the details of which will be discussed hereinbelow. The output of intermediate amplifier section 11b is coupled to a detector circuit 13 capable of producing at the output thereof a direct current signal indicative of the amplitude changes of the signal present in receiver 6 as is primarily evidenced by amplitude changes of the signals received on antenna 7.

Coupled to the output of detector 13 is a means 14 to establish a given reference signal level. Means 14 includes potentiometer 15 and reference voltage cell 16. Also coupled to the detector 13 is an arrangement 17 including chopper 18, amplifier stages 19, and the pen recording drive motor 20. Arrangement 17 is responsive to the difference between the signal level at detector 13 and the reference signal level such that a mechanical linkage 21 coupled to attenuator 12 actuates attenuator 12 to return the signal level at the output of detector 13 to the reference signal level and to simultaneously record the amplitude changes at the output of detector 13.

The signal level recording receiver illustrated in simplified form in the figure of the drawing, is essentially a very sensitive signal recording meter. The threshold signal level of the signal level recording receiver of this invention is a received signal equal to the receiver noise and, therefore, the receiver noise is employed as the reference signal level for the operation of this equipment so that signal level indications above and below the threshold signal level can be obtained. The reference signal level is set by the positioning of arm 22 of potentiometer 15 in the linear recorder 23 to balance the receiver noise output of detector 13, no difference voltage at contact 33, with piston attenuator 12 fully closed (miniumum attenuation) and no input signal applied from antenna 7. In a reduction to practice of the equipment shown in the figure of this drawing, a dynamic recording range of the receiver is 50 db above threshold, but the total range may be extended to approximately 70 db more by means of insertion of fixed attenuators at the input of the receiver. In the same reduction to practice, the selectivity of the receiver was established to be such as to have a 3 db band-pass of 320 cycles-per-second, which is equivalent to a noise band-pass of 500 cycles-per-second. This was achieved by quadruple heterodyning with the following frequencies used as IF's, 30 megacycles, 3.8 megacycles, 262 kilocycles, and 10 kilocycles.

In the signal level recording receiver of this invention the intrinsic gain of the receiver is constant, that is, the recorded output is as closely as possible a linear plot of the logarithmic ratio of input signal plus receiver noise to receiver noise. A departure from linearity occurs when the two quantities are of comparable amplitude. This linear characteristic is accomplished by means of a servo loop consisting of recording pen-drive motor 20 which is driven by the output of detector 13 which, in turn, mechanically drives piston 24 of attenuator 12 which controls the signal in receiver 6 to return to the reference signal level as established by arm 22 of potentiometer 15. The equivalent feedback in the reduction to practice is about 97%.

The piston attenuator 12 is a variable attenuator of the mutual inductance type operating on a transverse magnetic field as a waveguide below cutoff. The input fitting 25 is terminated in a tuned circuit 26 and is essentially a fixed energy coupling loop. A tuned circuit 27 is mounted on piston 24 which is moved by mechanical linkage 21 coupled between piston 24 and recording pen-drive motor 20. The attenuation in db (decibels) in attenuator 12 varies linearly with the mechanical separation of coils 28 and 29 of tuned circuits 26 and 27. In the reduction to practice of this invention, the tuned circuits were resonant at 30 megacycles and the input and output impedances of the attenuator were each 200 ohms. The attenuation contributed by attenuator 12 was 53.3 db per inch with a minimum attenuation of 20 db. As pointed out hereinabove, the mechanical drive is achieved by mechanical linkage 21 coupled to the pen-drive motor 20 of the recorder with a ratio such that full scale deflection of the pen 30 introduces 50 db of attenuation. The piston attenuator is fed by the output of IF amplifier 11a and supplies the input signal to the IF amplifier section 11b. Piston attenuator 12 may be described as a waveguide beyond the cutoff with a stationary loop 28 at one end and a movable loop 29 mounted on a piston 24. Due to the nature of the propagation through a waveguide beyond cutoff, the attenuation of the signal coupled to attenuator 12 in db is proportional to the linear displacement between the stationary loop 28 and the movable loop 29. Therefore, the piston attenuator 12 is a device in which linear motion of the piston 24 produces a logarithmic variation in attenuation. The piston 24 is mechanically coupled to the pen-drive motor 20, the servo-motor of self-balancing recorder 23, such that an increase or decrease in the D.C. (direct current) output of detector 13 drives the recording pen 30 upscale or downscale, respectively, inserting or removing attenuation, respectively, through the movement of piston 24 through mechanical linkage 21 until the detector output returns to its initial value as is set by arm 22 of potentiometer 15. Pen-drive motor 20 then comes to rest. The scale on the recording chart 31, and hence, the scale of the recorder may be calibrated directly in decibels (db) of the signal input level at antenna 7 relative to the receiver noise with minimum attenuation contributed by attenuator 12 and no signal input contributed by antenna 7, the reference signal level as established by the arm 22 of potentiometer 15 in conjunction with the reference cell 16 in shunt relation thereto.

The output of detector 13 is coupled to the linear recorder 23 which includes, as stated hereinabove, the means for establishing the reference signal level constituted by the reference cell 16 and the potentiometer 15. The position of arm 22 of potentiometer 15 is adjusted such as to establish the reference signal level at the noise figure of receiver 6 as described above. The negative output connection of detector 13 is connected to arm 22 of potentiometer 15 and the positive output connection of detector 13 is connected to contact 33 of chopper 18 so that the output voltage of detector 13 will be subtracted from the reference signal level on potentiometer 15. The vibrating contact 34 of chopper 18 driven by a 60-cycle voltage coupled to coil 35 alternately connects across the input of amplifier stage 19 a short circuit when connected to contact 32 and a series circuit including potentiometer 15 extending from point 32a to arm 22 and the output of detector 13 connected from arm 22 to contact 33 when connected to contact 33. Hence, the difference voltage between the output of detector 13 and the reference signal level is coupled to amplifier stages 19 which is then coupled to the recording pen-drive motor 20 through means of coils 36. The reference for the servo drive motor 20 is established by the 60-cycle voltage coupled to coil 37. When in operation, the chopper 18, through means of the vibrating contact 34, will alternately couple the positive output connection of detector 13 to amplifier stages 19 and will provide a comparison between the amplitude of the output of detector 13 and the reference signal level. Let us now consider in greater detail the operation of the signal level recording receiver of this invention. As pointed out hereinabove the reference signal level is set at the noise level of receiver 6 by adjusting the position of arm 22 until the output signal of detector 13 is balanced with attenuator 12 fully closed (minimum attenuation) and zero signal input from antenna 7. Under those conditions, the position of recording pen 30 on chart 31 corresponds to zero signal input and the chart can be so marked. This can be considered the zero stop position of the equipment under discussion. As input signal is contributed to receiver 6 from antenna 7 the amplitude of the output signal of detector 13 will increase and hence become greater than the reference signal level. This results in a positive square wave signal at the input of amplifier 19 having a magnitude equal to the difference between the amplitude of the output signal of detector 13 and the amplitude of the reference signal. The square wave signal, illustrated in curve 38, will have a frequency equal to the chopper frequency which in the example employed herein is 60 cycles, the frequency of the voltage coupled to coil 35. The resulting amplified output of amplifier 19, illustrated in curve 39, is coupled to drive coil 36 of pen drive motor 20 to drive motor 20 with respect to its reference coil 37 to insert attenuation in attenuator 12 through mechanical coupling 21 to thereby attenuate the signal coupled to amplifier 116 and thus return the amplitude of the output signal of detector 13 to the reference signal level. Motor 20 drives recording pen 30 up-scale to record the level of the signal received by antenna 7 and also drives the piston attenuator such that coupling loops 28 and 29 are separated to insert attenuation. Pen drive motor 20 also drives mechanical linkage 40 which in turn drives arm 41 of potentiometer 42. Potentiometer 42 is a rate of change potentiometer which in a sense is a speed control on pen drive motor 20 to prevent overshoots of this drive motor.

When the signal input received by antenna 7 becomes equal in magnitude to the receiver noise, the signal level recording receiver has reached its signal threshold level and the chart 31 should be calibrated to indicate this signal input level. On a decibel scale this position of pen 30 on chart 31 would correspond to a zero db received signal level. Those amplitudes of received signal between zero received signal and signal level equal to receiver noise would be indicated as minus decibels relative to the reference signal level and the amplitude of those received signals above the reference signal level would be plus decibels. The scale of chart 31 would be so marked. It should be noted that as the received signal input increases in amplitude from zero to the receiver noise level that the attenuator 12 is activated by motor 20 to insert attenuation in the receiver signal to maintain the amplitude of the signal output of detector 13 at the reference signal level. Thus, when the received signal level equals the receiver noise level (the reference signal level) the attenuator has been activated to separate coupling loops 28 and 29 and thus insert more than minimum attenuation in the receiver path. Thus, with the received signal level equal to the reference signal level and the equipment in a balanced condition with the coupling loops 28 and 29 separated as indicated above it is possible for the equipment to respond to received signal above and below the reference signal level. If the amplitude of the received signal continues to increase, motor 20 will be activated by the difference voltage at contact 33 to drive pen 30 further up-scale and to further separate coupling loops 28 and 29. If the amplitude of the received signal decreases below the received signal level that provided the last balance condition, the amplitude of the output signal of detector 13 will be less than the amplitude of the reference signal level established by potentiometer 15 and reference cell 16. When these signal amplitudes are compared as before, the output of chopper 18 will provide a negative square wave signal as illustrated in curve 43 which is applied to amplifier stages 19. The resultant amplified output 44 is coupled to drive coil 36 such that motor 20 will turn in a direction opposite to the direction when the difference voltage is positive thereby driving pen 30 down-scale and reducing the attenuation in the receiver signal path by driving coils 28 and 29 into closer proximity. This reduction in attenuation will result in an increase in signal amplitude at the input of detector 13 and hence an increase in the signal amplitude at the output of detector 13. The motor 20 will operate until the amplitude of the output signal of detector 13 is increased to a value equal to the reference signal level. If the amplitude of the received signal continues to decrease, the operation described immediately above will continue until such time that the amplitude of the received signal equals zero and the attenuation is fully closed, the change in received signal amplitude being continuously recorded by pen 30 on chart 31.

To provide a continuous recording of signal level changes, two chart drive motors 45 and 46 are provided. Chart drive motor 46 being a low speed nature, and motor 45 driving the chart at a relatively high speed. Switch 47 provides the operator with a choice of speed of recording.

As pointed out hereinabove in describing the operation of the self-balancing linear recorder 23 if an unbalance occurs by the amplitude of the output signal of detector 13 being different than the reference signal level, as established by battery 16 and potentiometer 15, the pen-drive motor 20 will drive attenuator 12 in a manner to return the output of detector 13 to the reference signal level and hence brings the recorder back into balance again and thereby readying this recorder for the next change in signal amplitude. This balancing through means of actuation of attenuator 12 when a difference of potential between the amplitude of the signal output of detector 13 and the amplitude of the reference signal level is present provides a constant output from receiver 6 and simultaneously provides a recording of the signal level changes which is logarithmic in nature.

While I have described above the principles of my invention in connection with specific apparatus, it is to be clearly understood that this description is made only by way of example and not as a limitation to the scope of my invention as set forth in the objects thereof and in the accompanying claims.

I claim:
1. A signal level recorder comprising a path for signals, a variable attenuator disposed in said path, and a linear recorder coupled to the output of said path responsive to amplitude changes of the signals in said path, said recorder including means to convert said amplitude changes into an alternating signal and means responsive to said alternating signal coupled to said attenuator for linear adjustment thereof to vary the attenuation of said attenuator logarithmically to maintain the amplitude of the signals at the output of said path at a predetermined value and to simultaneously record said amplitude changes.

2. A signal level recorder comprising a path for signals, a logarithmic attenuator disposed in said path and a linear recorder unit including a first means electrically coupled to the output of said path responsive to amplitude changes of the signals in said path to produce a control signal, a second means to convert said control signal to an alternating signal, and a third means responsive to said alternating signal to simultaneously actuate said attenuator for linear adjustment thereof to vary the attenuation thereof logarithmically to maintain the amplitude of the signals at the output of said path at a predetermined value and to record said amplitude changes.

3. A signal level recording receiver comprising in combination a signal receiver having a signal path therethrough from a signal input means to a signal output means and a logarithmic attenuator disposed in said signal path; and a linear recorder electrically coupled to said output means including means to convert the amplitude changes of the signals in said signal path to an alternating signal indicative of said amplitude changes and means responsive to said alternating signals to simultaneously actuate said attenuator for linear adjustment thereof to vary the attenuation thereof logarithmically to maintain the amplitude of the signals at said output means at a predetermined value and to record said amplitude changes.

4. A signal level recording receiver comprising a signal receiver having signal input means, signal output means, and an attenuator coupled intermediate said input means and said output means, a series circuit including means to establish a given reference signal level and said output means connected in a subtractive relationship to produce a control signal proportional to the difference between the signal level at said output means and said reference signal level, and means alternately connected and disconnected to and from said series circuit to respond to said control signal to simultaneously actuate said attenuator to maintain said signal level at said output means at said reference signal level and to record the changes of said signal level at said output means.

5. A signal level recording receiver comprising a signal receiver having a signal input means, signal output means, and a logarithmic attenuator coupled intermediate said input means and said output means, a series circuit including means to establish a given reference signal level and said output means connected in a subtractive relationship to produce a control signal proportional to the difference between the signal level at said output means and said reference signal level, and means alternately connected and disconnected to and from said series circuit to respond to said control signal to simultaneously actuate said attenuator for linear adjustment thereof to vary the attenuation thereof logarithmically to maintain said signal level at said output means at said reference signal level and to record the changes of said signal level at said output means.

6. A signal level recording receiver comprising in combination a signal receiver having a signal input means, a detector, and a logarithmic attenuator coupled intermediate said input means and said detector; and a linear recorder including means to establish a given reference signal level, means to couple said reference signal to said detector to produce at the output thereof a control signal proportional to the changes in the signal level at said detector relative to said reference signal level, and means including a servo motor coupled to said detector responsive to said control signal to simultaneously actuate said attenuator for linear adjustment thereof to vary the attenuation logarithmically to maintain said signal level at said detector at said reference signal level and to record said signal level changes at said detector.

7. A signal level recording receiver comprising in combination a signal receiver having signal input means, a detector, and a logarithmic attenuator coupled intermediate said input means and said detector; and a linear recorder including a voltage source, a potentiometer in shunt relation to said voltage source to establish a given reference signal level, means to couple said reference signal to said detector to produce at the output thereof a control signal proportional to the changes in the signal level at said detector relative to said reference signal level, and means including a servo motor coupled to said detector responsive to said control signal to simultaneously actuate said attenuator for linear adjustment thereof to vary the attenuation logarithmically to maintain said signal level at said detector at said reference signal level and to record said signal level changes at said detector.

8. A signal level recording receiver comprising in combination a signal receiver having signal input means, a detector, and a logarithmic attenuator coupled intermediate said input means and said detector; and a linear recorder including a voltage source, a potentiometer in shunt relation to said voltage source to establish a given reference signal level, means to couple said reference signal to said detector to produce at the output thereof a control signal proportional to the changes in the signal level at said detector relative to said reference signal level, a pen drive motor, a recording pen coupled to said motor, means connecting said motor to said detector to render said motor responsive to said control signal to simultaneously actuate said attenuator to maintain said signal level at said detector at said reference signal level and to actuate said pen to record said signal level changes at said detector.

9. A signal level recording receiver comprising in combination a signal receiver having signal input means, a detector, a logarithmic attenuator coupled intermediate said input means and said detector including a waveguide beyond cutoff, a stationary energy coupling loop at one end of said waveguide coupled to said input means and an energy coupling loop mounted on a movable piston coupled to said detector; and a linear recorder including a voltage source, a potentiometer in shunt relation to said voltage source to establish a given reference signal level, means to couple said reference signal to said detector to produce at the output thereof a control signal proportional to the changes in the signal level at said detector relative to said reference signal level, a pen drive motor, a recording pen coupled to said motor, means coupling said motor to said movable piston, means connecting said motor to said detector to render said motor responsive to said control signal to simultaneously move said movable piston relative to said stationary loop linearly to vary the attenuation of said attenuator logarithmically to maintain said signal level at said detector at said reference signal level and to simultaneously actuate said pen to record said signal level changes at said detector.

10. A signal level recording receiver comprising in combination a signal receiver including a receiving antenna to receive radio frequency signals from a distant transmitter, a heterodyne means coupled to said antenna to translate said received signal to an intermediate frequency signal, a first intermediate frequency amplifier portion to amplify said intermediate frequency signal, a logarithmic attenuator coupled to the output of said first portion including a waveguide beyond cutoff, a stationary energy coupling loop at one end of said waveguide coupled to said first portion and an energy coupling loop mounted on a movable piston, a second intermediate frequency amplifier portion coupled to said movable piston, and a signal amplitude detector coupled to the output of said second portion; and a linear recorder including a voltage source, a potentiometer in shunt relation to said voltage source to establish a given reference signal level, means to couple said reference signal to said detector output to produce a direct current control signal proportional to the changes in the signal level at said detector output relative to said reference signal level, a pen drive motor, a recording pen coupled to said motor, means coupling said motor to said movable piston, an alternating circuit amplifier having its output coupled to said motor, means alternately connecting and disconnecting the input of said amplifier to and from said detector output to amplify said control signal and to render said motor responsive to said amplified control signal to simultaneously move said movable piston relative to said stationary loop linearly to vary the attenuation of said attenuator logarithmically to maintain said signal level at said detector output at said reference signal level and to actuate said pen to record said signal level changes at said detector output.

11. A signal level recorder comprising a path for signals, a variable attenuator including first and second tuned circuits in spaced inductive coupling relation with respect to each other disposed in said path, and a linear recorder coupled to the output of said path including means to convert the amplitude changes of the signals in said path to an alternating signal and means responsive to said alternating signals coupled to said attenuator for linear adjustment of thee spacing between said tuned circuits to vary the attenuation of said attenuator logarithmically to maintain the amplitude of the signals at the output of said path at a predetermined value and to simultaneously record said amplitude changes.

References Cited in the file of this patent
UNITED STATES PATENTS

| | | |
|---|---|---|
| 2,622,192 | Tarpley | Dec. 16, 1952 |
| 2,666,183 | Ocnaschek | Jan. 12, 1954 |
| 2,684,462 | Tyzzer | July 20, 1954 |
| 2,701,863 | Pierce | Feb. 8, 1955 |
| 2,779,869 | Gerks | Jan. 29, 1957 |

FOREIGN PATENTS

| | | |
|---|---|---|
| 647,064 | Great Britain | Dec. 6, 1950 |